United States Patent [19]

Shiomura et al.

[11] 4,028,481

[45] June 7, 1977

[54] PRODUCTION OF OLEFIN POLYMERS AND NOVEL CATALYSTS THEREFORE

[75] Inventors: Tetsunosuke Shiomura; Akiro Ito; Yoshio Morimoto; Tetsuya Iwao, all of Nagoya, Japan

[73] Assignee: Mitsui Toatsu Chemicals, Incorporated, Tokyo, Japan

[22] Filed: Aug. 6, 1973

[21] Appl. No.: 385,665

Related U.S. Application Data

[63] Continuation of Ser. No. 153,791, June 16, 1971, abandoned.

[30] Foreign Application Priority Data

| | | |
|---|---|---|
| June 18, 1970 | Japan | 45-52420 |
| July 31, 1970 | Japan | 45-66627 |
| Nov. 6, 1970 | Japan | 45-97711 |
| Dec. 28, 1970 | Japan | 46-129938 |
| Dec. 28, 1970 | Japan | 46-129934 |
| Dec. 28, 1970 | Japan | 46-129935 |
| Dec. 29, 1970 | Japan | 46-129922 |
| Dec. 29, 1970 | Japan | 46-129924 |

[52] U.S. Cl. ............................ 526/142; 252/429 B; 252/429 C; 526/139; 526/140; 526/143; 526/159; 526/161; 526/348; 526/351; 526/352; 526/906

[51] Int. Cl.$^2$ ..................... C08F 4/66; C08F 10/06

[58] Field of Search .................... 252/429 B, 429 C; 260/88.2, 93.7, 94.9 C, 94.9 E; 526/142, 158

[56] References Cited

UNITED STATES PATENTS 3,701,763  10/1972  Wada et al. ............... 260/94.9 C

FOREIGN PATENTS OR APPLICATIONS 1,001,820  8/1965  United Kingdom

*Primary Examiner*—Edward J. Smith
*Attorney, Agent, or Firm*—Fisher, Christen & Sabol

[57] ABSTRACT

In the polymerization of α-olefins, a titanium trichloride containing catalyst activated by copulverization with at least one additive selected from I. An organic compound containing oxygen, sulfur or phosphorus such as:
  a. Organic oxygen compounds selected from ethers, ketones and esters;
  b. Organic sulfur compounds selected from thioethers, thiophenols and thioalcohols; and
  c. Organic phosphorus compounds.
II. An organic compound of (I) containing oxygen, sulfur or phosphorus in combination with an aluminum halide, and
III. A complex or reaction product of an organic compound of (I) with an aluminum halide.

provides substantially improved catalytic activity and reduces amorphous polymeric by-products while enhancing stereoregularity. The catalytic activity of these catalysts is further enhanced by washing with an organic solvent subsequent to copulverization to remove excess additive. Preferred catalysts are those which contain aluminum chloride with the titanium trichloride. The aluminum trichloride may be provided as an integral part of the titanium trichloride, in admixture therewith, in admixture with the additive as a complex with one or more of the additives, as a reaction product of one or more of the additives or any combination of the above.

17 Claims, No Drawings

PRODUCTION OF OLEFIN POLYMERS AND NOVEL CATALYSTS THEREFORE

This is a continuation of application Ser. No. 153,791, filed June 16, 1971, now abandoned.

BACKGROUND OF THE INVENTION

This invention relates to the polymerization or copolymerization ethylene and/or α-olefins. More particularly, the invention relates to newly-developed, highly active catalysts prepared by a novel activation treatment of the titanium trichloride component of conventional catalysts for polymerization, including copolymerization, of ethylene or α-olefins using the complex catalysts of titanium trichloride and organometallic compounds. As used herein, the term "polymerization" includes copolymerization as well as the homopolymerization of α-olefins.

The polymerization of ethylene and α-olefins to solid polymers employing catalyst systems containing a transition metalhalide, such as titanium trichloride or titanium tetrachloride, an organometallic compound, and other organic compounds, such as amines, ethers and thioethers is well known.

A complex transition metal halide of an aluminum reduced titanium trichloride having the empirical formula $3TiCl_3 \cdot AlCl_3$ provides the best results in the polymerization of ethylene, α-olefins and especially propylene. Usually the organometallic compound is a trialkyl aluminum or dialkyl aluminum monohalide.

However, the polymerization of α-olefins using these catalysts has the following defects: (1) trialkyl aluminum as organometallic compound has a high activity; but; yields a substantial amount of amorphous polymer; (2) dialkylaluminum monohalide reduces the yield of amorphots polymer but the rate of polymerization is slow. Therefore, a highly active catalytic system, which selectively includes the yield of crystalline polymer over that of amorphous polymer is in demand.

OBJECTS OF THE INVENTION

It is an object of the present invention to provide improved catalysts for the polymerization of ethylene and other α-olefines.

It is another object of the present invention to provide a method of activating polymerization catalysts containing titanium trichloride.

It is a further object of the present invention to provide a catalyst for ethylene and other olefines that increases the polymer yield on either a per unit catalyst or per unit monomer basis.

It is still another object of the present invention to provide a catalyst for the polymerization of α-olefines that produces stereoregular polymeric products with little amorphous polymer by-product.

These and other objects will be apparent from the description of the present invention.

DESCRIPTION OF THE BROAD INVENTION

We have unexpectedly discovered that the disadvantages of the prior art catalysts are overcome by the use of a specially activated titanium trichloride component. According to the invention, titanium trichloride or a titanium trichloride containing composition is treated by at least one activator, hereinafter referred to as an additive, selected from I. An organic compound containing oxygen, sulfur or phosphorus such as:
 a. Organic oxygen compounds selected from ethers, ketones and esters;
 b. Organic sulfur compounds selected from thioethers, thiphenols and thioalcohols; and
 c. Organic phosphorus compounds.
II. An organic compound of (I) containing oxygen, sulfur or phosphorus in combination with an aluminum halide, and
III. A complex or reaction product of an organic compound of (I) with an aluminum halide.

The mixture of titanium trichloride and additive is pulverized and soluble substances are removed by washing with a solvent. Then the solvent is removed, if desired, and the mixture is heat-treated. The activated titanium trichloride or the activated composition containing titanium trichloride of the present invention results.

When α-olefins such as propylene are polymerized using catalysts made from the activated titanium trichloride component and organoaluminum compound, the rate of polymerization is very high and the polymer product has a very high stereoregularity.

Japanese Pat. Publication Nos. 43-15620, 43-10065 and 42-3024 teach polymerization of propylene using the catalyst systems of an organoaluminum compound and titanium trichloride composition obtained by copulverizing titanium trichloride or titanium trichloride composition with ketones, or ethers with or without titanium tetrachloride. These catalytic systems aim to improve particle size distribution and stereoregularity of polypropylene.

Also, the method improving stereoregularity of polymer product by adding the said organic compounds into the Ziegler-Natta catalytic system is taught in Japanese Pat. Publication Nos. 43-27419, 37-9338, 39-5455, 39-24703, 43-10069 and 42,22052.

However, the prior art processes have the following defects: (1) In many cases, lowering of catalytic activity results from the additives; (2) Deactivation of catalysts by alcohols and the like after polymerization contaminates or erodes the surface of the autoclave, especially when organic sulfur compounds are employed; (3) Product polymer ash increases and causes qualitative problems such as discoloring of the polymer; (4) Deactivation of catalysts by alcohol and the like following polymerization often produces a strong displeasant odorus compound and the smell remains in the polymer products (This phenomenon is especially noticeable when the catalyst contains organophosphorus compounds); (5) The separation of the water phase is often difficult when the polymer is washed with water, and (6) The molecular weight of polymer products varies considerably.

According to the present invention, the catalyst is activated by copulverizing titanium trichloride or other titanium trichloride compositions with at least one hetero-organic additive in the list (I a-c, II and III) and washed with a solvent.

The catalysts thus activated are very effective for the polymerization of ethylene or other α-olefins compared with the said well known method. Not only do the catalysts of this invention exhibit very good activity in polymerizing ethylene or α-olefins, but the α-olefin polymer products have more stereo-regularity. Thus, not only is the yield of polymer per unit monomer increased, but also the yield of polymer per unit catalyst. Furthermore, using the catalysts of the present invention produces in very little by-product making it possible to simplify both the polymerization and refining procedures.

The previously noted disadvantages of the prior art using additives as a third component in a Ziegler-Natta catalysts system are absent from the catalysts of this invention, because additives, other than those coordinated or absorbed at the active sites, are removed by washing with solvent after copulverizing titanium trichloride with the additives.

Titanium trichloride or titanium trichloride compositions as used herein, includes all titanium trichloride or titanium trichloride compositions containing titanium trichloride as the major component such as, titanium trichloride or titanium trichloride composition reduced from titanium tetrachloride by hydrogen, an organoaluminum compound, or a compound having Si—H bond and compositions containing titanium trichloride and other metal-halides obtained by reducing titanium tetrachloride with a metal.

The following list of compounds are examples of compounds containing hetero atoms, which are useful as additives or one component of the additives of this invention.

ETHERS, KETONES AND ESTERS I(a)

Saturated and unsaturated ethers, cyclic ethers and polyethers are suitable for practicing the present invention. Compounds of the formula $R^1$—O—$R^2$ wherein $R^1$ and $R^2$ represent alkyl, aralkyl, cycloalkyl, alkenyl, alkylene, alkaryl and aryl having up to 20 carbon atoms and preferably up to 12 carbon atoms or a halogen substituted derivative thereof are suitable. Specific examples of suitable ethers are diethyl ether, di(n-propyl) ether, diisopropyl ether, dibenzyl ether, dicyclohexyl ether, diphenyl ether, ditolyl ether, methylphenyl ether, diallyl ether, butenyl ether, di(4-chlorophenyl) ether, di(2-chlorophenyl) ether, tetrahydrofuran, propyleneoxide and dioxane. Specific examples of polyethers are bis($\beta$-hydroxyethyl) ether, bis(methoxyethyl ether, bis($\beta$-ethoxyethyl) ether, bis($\beta$-propoxyethyl) ether, $\beta$-hydroxyethyl-$\beta'$-methoxy diethyl ether, ($\beta$-ethoxymethyl)methyl ether, ($\beta$-phenoxyethyl)phenyl ether and ($\beta$-toloxyethyl)tolyl ether.

Saturated or unsaturated ketones, cyclic ketones and ester ketones are useful as additives. Compounds of the formula

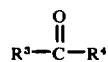

wherein $R^3$ and $R^4$ represent alkyl, aralkyl, alkenyl, cycloalkyl, alkaryl and aryl having up to 20 carbon atoms and preferably up to 12 carbon atoms or halogenated derivatives thereof are suitable. Specific examples are acetone, diethyl ketone, methylisobutyl ketone, methylbenzyl ketone, acetophenone, diphenyl ketone, cyclohexanone, 2,4-pontanedione, allylphenyl ketone, p-chlorophenylmethyl ketone, methyltolyl ketone, and the like.

Saturated or unsaturated esters and cyclic esters are useful additives for practicing the present invention. Compounds of the formula

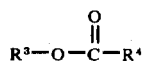

wherein $R^3$ and $R^4$ are as indicated above are suitable. Specific examples are methyl acetate, ethyl acetate, methyl acetoacetate, cyclohexyl acetate, benzyl acetate, methyl benzoate, $\epsilon$-carolactone, ethyl chloroacetate the like.

Diethyl ether, diphenyl ether, ditolyl ether, di(2-chlorophenyl) ether, diethyl ketone, diphenyl ketone and methyl acetate are the preferred compounds of group I(a).

THIOETHERS, THIOPHENOLS AND THIOALCOHOLS I(b)

Saturated or unsaturated thioethers or cyclic thioethers are useful additives for the present invention. Sulfur compounds of the formula $R^1$—S–$R^2$ wherein $R^1$ and $R^2$ are as indicated above are suitable. Specific examples are diethyl sulfide, di(n-propyl) sulfide, dicyclohexyl sulfide, diphenyl sulfide, ditolyl sulfide, methylphenyl sulfide, ethylphenyl ethylphenyl sulfide, propylphenyl sulfide, dibenzyl sulfide, diallyl sulfide, allyphenyl sulfide, di(2-chlorophenyl) sulfide, ethylene sulfide, propylene sulfide, tetramethylene sulfide and pentamethylene sulfide.

Thiophenols and thioalcohols which are saturated or unsaturated are useful additives for the present invention. Compounds of the formula H—$SR^3$ wherein $R^3$ is as indicated above are suitable. Specific examples are ethanethiol, propanethiol, butanethiol, hexanethiol, dodecanethiol, cyclohexanethiol, $\alpha$-mercaptotoluene, 2-propene-1-thiol, benzenethiol, o-toluenethiol, p-toluenethiol, 2-chloroethanethiol and p-chlorobenzenethiol. The preferred compounds of group I(b) are diethyl sulfide, di(n-propyl) sulfide, dibenzyl sulfide, diphenyl sulfide, methylphenyl sulfide, ethylphenyl sulfide, tetramethylene sulfide, dodecanethiol and benzenethiol.

ORGANOPHOSPHORUS COMPOUNDS I(c)

Phosphines of the formula $P(R^3)a(H)_{3-a}$ wherein $R^3$ is as indicated above and a is 1, 2 or 3 are useful additives for the present invention. Specific examples are ethyl phosphine, diethyl phosphine, phenyl phosphine, diphenyl phosphine, triethyl phosphine, tri(n-butyl) phosphine, tri(n-decyl) phosphine, tribenzyl phosphine, tricyclohexyl phosphine, triphenyl phosphine, tritolyl phosphine, diethyl(n-butyl) phosphine, ethyldiphenyl phosphine, (n-propyl) (n-butyl) phenyl phosphine and ethylbenzyl phenyl phosphine.

Phosphine halides of the formula $P(R^3)2X$ wherein $R^3$ is as indicated above are useful additives for the present invention. Specific examples are dimethyl bromophosphine, diethyl chlorophosphine, diisopropyl chlorophosphine methylethyl chlorophosphine, diphenyl chlorophosphine, and ethylphenyl chlorophosphine.

Phosphine dihalides of the formula $P(R^3)X_2$ wherein $R^3$ is as indicated above and X is a halogen are suitable additives for the present invention. Specific examples are dichloro methylphosphine, dibromo methylphosphine, dibromo ethylphosphine, dichloro butylphosphine, dichloro benzylphosphine, dichloro cyclohexylphosphine, dichlorophenylphosphine and dibromo phenyl phosphine.

Esters of phosphinous acid having the formula $(R^3)_2$ $POR^4$ wherein $R^3$ and $R^4$ are as indicated above are useful additives for practicing the present invention.

Specific examples are ethyl diethylphosphinite, ethyl dipropylphosphinite, ethyl dibutylphosphinite, phenyl diphenylphosphinite, ethyl diphenylphosphinite, phenyl dibenzylphosphinite, and ethyl methylphenyl phosphinite.

Esters of phosphonous acid having the formula $R^3P(OR^4)_2$ wherein $R^3$ and $R^4$ are as indicated above are useful for practicing the present invention. Specific examples are dimethyl ethylphosphonite, diethyl ethyl phosphonite, diethyl butylphosphonite, diethyl benzylphosphonite, diethyl phenylphosphonite, diphenyl methylphosphonite, diphenyl ethylphosphonite, and diphenyl phenyl phosphonite.

Esters of phosphorous acid having the formula $P(OR^3)_a(OH)_{3-a}$ wherein $R^3$ and a are as defined above are useful additives for the present invention. Specific examples are dimethyl phosphite, diphenyl phosphite, dioctyl phosphite, trimethyl phosphite, tri(2-chloroethyl)phosphite, tri(n-butyl) phosphite, tribenzyl phosphite, tricyclohexyl phosphite, triphenyl phosphite, tri(p-tolyl) phosphite, tri($\beta$-naphthyl) phosphite, diphenylcyclohexyl phosphite, and diphenyl propyl phosphite.

Esters of halogenophosphorous acid of the formula $P(OR^3)_2X$ wherein $R^3$ is as indicated above and X represents halogen are suitable for the present invention. Specific examples are dimethyl chlorophosphite, diethyl chlorophosphite, di(n-butyl) chlorophosphite, dicyclohexyl chlorophosphite, diphenyl chlorophosphite and di(p-tolyl) chlorophosphite.

Esters of dihalogenophosphorous acid of the formula $P(OR^3)X_2$ wherein $R^3$ is as indicated above and X represents halogen are suitable for practicing the present invention. Specific examples are methyl dichlorophosphite, methyl chlorofluorophosphite, ethyl dichlorophosphite, allyl dichlorophosphite, n-butyl dichlorophosphite, phenyl dichlorophosphite, p-chlorophenyl dichlorophosphite and 2-chloroethyl dichlorophosphite.

Aminophosphines of the formula $P[N(R^5)_2]_3$; $[N(R^5)_2]_2 PX$ and $N(R^5)_2 PX_2$ wherein $R^5$ represents alkyl or aryl having up to 20 carbon atoms and preferably 12 carbon atoms and X represents halogen are useful additives for the present invention. Specific examples are tris(dimethylamino)phosphine, tris(diethylamino) phosphine, tris(di-n-butylamino)phosphine, tris(N-methylanilide-N-) phosphine, bis(dimethylamino) chlorophosphine, dimethylaminodifluorophosphine, diethylamino dichlorophosphine and (di-n-butylamino) dichlorophosphine.

Esters of phosphoric acid of the formula $P(O)(OR^3)_a(OH)_{3-a}$ wherein $R^3$ and a are as indicated above are suitable additives for the present invention. Specific examples are methyl phosphate, ethyl phosphate, n-butyl phosphate, cyclohexyl phosphate, phenyl phosphate, p-chlorophenyl phosphate, diethyl phosphate, di(n-propyl) phosphate, dibenzyl phosphate, diphenyl phosphate, di-$\alpha$-naphthyl) phosphate, di(biphenyl) phosphate, triethyl phosphate, tri(n-butyl) phosphate, tri(n-amyl) phosphate, tricyclohexyl phosphate, tri(o-chlorophenyl) phosphate, triphenyl phosphate, tri(p-tolyl) phosphate, tri(m-tolyl) phosphate, tri(4-biphenyl) phosphate, and tri($\alpha$-naphthyl) phosphate.

Esters of halophosphoric acid of the formula $P(O)(OR^3)_2X$ wherein $R^3$ is as indicated above and X indicates halogen are useful additives for present invention. Specific examples are dimethyl chlorophosphate, diethyl chlorophosphate, diisopropyl chlorophosphate, dicyclohexyl chlorophosphate, and diphenyl chlorophosphate.

Esters of dihalophosphoric acid of the formula $P(O)(OR^3)X_2$ wherein $R^3$ is as indicated above and X represents halogen are useful additives for the present invention. Specific examples are methyl dichlorophosphate, ethyl dichlorophosphate, ethyl chlorofluorophosphate, n-butyl dichlorophosphate, p-tolyl dichlorophosphate and phenyl dichlorophosphate.

Phosphine oxides and amino derivatives of the formula $(R^3)_3P=O$ and $[(R^3)_2N]_3P=O$ wherein $R^3$ is as indicated above are useful additives for the present invention. Specific examples are trimethyl phosphine oxide, tri(n-butyl) phosphine oxide, tribenzyl phosphine oxide, tricyclohexyl phosphine oxide, triphenyl phosphine oxide, diallyl phenyl phosphine oxide, diphenyl benzyl phosphine oxide, diphenyl-p-tolyl phosphine oxide, tris(dimethyl amino) phosphine oxide and tris(diethylamino) phosphine oxide.

Phosphine sulfides of the formula $(R^3)_3P=S$ wherein $R^3$ is as indicated above are useful additives for the present invention. Specific examples are trimethyl phosphine sulfide, triethyl phosphine sulfide, tri(n-propyl) phosphine sulfide, tri(n-butyl) phosphine sulfide, triphenyl phosphine sulfide, diethylphenyl phosphine sulfide, and diphenylbenzyl phosphine sulfide.

Triphenyl phosphine, triphenyl phosphite, triphenyl phosphine oxide, tri(n-butyl) phosphate, triphenyl phosphate and tri(p-tolyl) phosphate are the preferred additives of group I(c).

Aluminum halides suitable for this invention are aluminum trichloride, aluminum tribromide, aluminum trifluoride, and aluminum triiodide. Aluminum trichloride is preferred. When the hetero-organic additive is used together with aluminum halide, the preferred mole ratio is about 1:1, although either component can be in an excess usually within the range of 2:1 to 1:2.

The complex or reaction products of the hetero-organic additive with aluminum halide may be used in this invention. The preferred complexes are diphenyl ether-aluminum trichloride; diphenyl ether-aluminum tribromide; diethyl ether-aluminum trichloride; diethyl ketone-aluminum trichloride; diphenyl sulfide-aluminum trichloride; phenylmethyl sulfide-aluminum trichloride; triphenyl phosphine-aluminum trichloride; triphenyl phosphite-aluminum trichloride; triphenyl phosphate-aluminum trichloride; tritolyl phosphate-aluminum trichloride; and tris(NN-dimethylamino) phosphite-aluminum trichloride and the preferred products are those of benzenethiol-aluminum trichloride; diethyl sulfide-aluminum trichloride.

These complexes or reaction products are prepared by methods well known to those skilled in the art. For example, they are usually synthesizes simply by mixing aluminum trihalide and the hetero-organic additive at room temperature or by heating the mixture.

It is preferred to synthesize the complexes or reaction products with a mole ratio of aluminum trihalide to the hetero-organic additive that is near 1:1. However, complexes or reaction products having the components in excess can be used.

The amount of additive copulverized with titanium trichloride or a titanium trichloride containing composition will vary somewhat, depending upon the particular additive, the particular catalyst, and the extent of activation desired or necessary. In general the amount of additive is in the order of 0.1 to 100 weight parts and preferably 1 to 30 weight parts per 100 weight parts catalyst (titanium trichloride or titanium trichloride composition). The entire amount of additive is usually added to titanium trichloride or titanium trichloride composition before pulverizing or it can be added in increments during copulverization. When more than two components of additives are used together, they can be added together to the catalyst, separately or as a prepared mixture during pulverization.

Conventional pulverizers are suitable for practicing the present invention. Examples include ballmills, vibrational mills, jet pulverizing machines, ring mills, and impact pulverizing machines. Pulverization is preferably conducted under a vacuum or inert gas atmosphere with the exclusion of moisture and oxygen. The temperature during the pulverization operation is not critical but is preferably in the range of 0° C to 150° C. Pulverization time differs according to the kind of pulverizer used, catalyst and additive, but is usually between 2 to 100 hours and preferably about 5 to 60 hours.

The high degree of activation of the catalysts according to the present invention is further enhanced by washing the pulverized catalyst containing the additives with a solvent and any residual solvent may be removed, if desired.

Suitable solvents for practicing this invention are aliphatic, cycloaliphatic, and aromatic hydrocarbons, their halogen derivatives and mixtures thereof. Specific examples are n-hexane, cyclohexane, n-heptane, benzene, toluene, xylene, monochloro-benzene and the like. The amount of solvent used is 1 to 500 times (weight) of the said copulverized titanium trichloride composition, and the washing is generally conducted at a temperature of 0° C to 200° C. The solvent can be separated from the activated catalyst by decantation or filtering. After several washes, an activated titanium trichloride catalyst is obtained, which can be used as a polymerization catalyst wet, or can be used after removal of the small amount of adherent solvent under normal pressure or reduced pressure. At least 30 weight percent and preferably more than 50 weight percent of the additive is removed by washing according to the invention.

A co-crystal prepared by reducing titanium tetrachloride with aluminum in the presence of aluminum trichloride, of which the approximate composition is of the empirical formula $3TiCl_3 \cdot AlCl_3$, is well known to the art. This co-crystal is hereinafter referred to as the AA type titanium trichloride. When the AA type titanium trichloride is washed with a solvent having a high solvency for aluminum trichloride, such as toluene, aluminum trichloride at the particle surface and adjacent thereto is dissolved in the solvent.

This washed AA type titanium trichloride in combination with an organoaluminum compound can produce a polymer having more improved stereoregularity than an unwashed AA type titanium trichloride. Shokubai (Catalyst) 11(3), 67-69(1969).

Washing of AA type titanium trichloride as shown in Comparison Example Al-3 was also examined. The stereoregularity of polymer and polymerization activity were noted to increase by the washing with toluene, or n-heptane compared with catalysts without washing. However, according to this invention, the stereoregularity and polymerization activity are even further increased as shown by comparison with Examples 1 and 4.

By combining the active titanium trichloride component obtained by the method of this invention with an organoaluminum compound, a highly active and highly stereospecific catalyst can be obtained.

It is believe that the number of active sites in the titanium trichloride component activated according to the present invention is increased through the addition of additive, pulverizing and washing, while the type of active site which produces less crystallinity is deactivated by the invention.

According to this invention, the characteristics of the catalyst can be varied by the selection of the type and amount of additive. The general rules for selection are as follows:

A. When the main purpose is the improvement of catalytic activity, the organic oxygen additives are most suitable and the organophosphorus additives are the second choice.

B. When the purpose is improvement of the stereoregularity of the polymer products, the organosulfur additives are best and next the organophosphorus additives.

C. When the purpose is to improve both catalytic activity and stereoregularity, it is most effective to use an additive containing both an organo oxygen and organophosphorus compounds.

D. It is most desirable to use the hetero-organo additive together with an aluminum halide as a mixture or as a complex or reaction product to improve catalytic activity.

All catalyst combinations that are known for the polymerization of olefins containing titanium trichloride are improved by the use of the active titanium trichloride component of the present invention. Third additive components known for use in titanium trichloride-organoaluminum catalyst systems are also employable in practicing the present invention. Compounds corresponding to the formulae $Al(R^5)_2X$ and $Al(R^5)_3$ wherein $R^5$ is alkyl or aryl having up to 20 carbon atoms and preferably up to 12 carbon atoms, X is halogen or alkoxy are preferred for use with this invention. Examples of preferred compounds are diethylaluminum monochloride, triethylaluminum di(n-propyl) aluminum monochloride, diisopropylaluminum monochloride, tri(n-butyl) aluminum, diisobutylaluminum monochloride, triisobutylaluminum, ethylaluminum ethoxy monochloride, diethylaluminum monoethoxide and mixtures thereof. The mole ratio of the organoaluminum compound to the active titanium trichloride component usually is between 1:0.3 & 1:100 and preferably 1:0.5 to 1:50.

Ethylene and other α-olefins including for example, propylene, butene-1-pentene-1, hexene-1,4-methylpentene-1 and mixtures thereof are monomers for which this invention is applicable.

The polymerization is usually conducted at temperatures of about 20° to 200° C., preferably 50° to 100° C and pressures ranging from 1 to 200 atm., preferably below 100 atm.

Solvents such as, aliphatic, cycloaliphatic and aromatic hydrocarbons and their mixtures may be used in the polymerization reaction. Example of suitable solvents include propane, butane, hexane, heptane, cyclohexane, benzene, toluene and the like. The polymerization can be also conducted without a solvent. Therefore, both gas phase polymerization and mass polymerization procedures may be practiced according to the present invention. After the polymerization is completed, the catalyst and solvent can be removed from the polymer by conventional procedures.

The high catalytic activity of the catalysts of the present invention is demonstrated by much larger polymer yield per unit titanium trichloride than is produced by prior art catalysts. Hence according to this invention, especially in gas phase and mass polymerization, the laborious post-polymerization treatments can be dispensed with.

The molecule weight of polymer produced according to this invention can be controlled by the catalysts system and polymerization procedure. As occasion demands, the molecular weight of the polymer can be further controlled by using hydrogen, alkyl halide, dialkyl zinc and the like for example.

The following examples are presented to demonstrate specific embodiments of the invention. The catalytic activity presented is based on grams of polymerized product per hour per gram of the activated titanium trichloride component (g/g hr).

EXAMPLE 1

Thirty grams of AAtype titanium trichloride and 2.3 grams of the diphenyl ether-aluminum trichloride complex were placed in a vibrational mill having a 600 ml inner volume containing about 80 steel balls of 12 mm diameter under an anhydrous nitrogen atmosphere and were pulverized at room temperature for 14 hours. The pulverized product was separated from steel balls under a nitrogen atmosphere.

Twenty grams of the pulverized product was stirred into 200 ml of boiling toluene for 20 minutes and then toluene was separated by decantation. After 4 times repeating this washing treatment, the residual toluene was removed by evaporation and the dry activated titanium trichloride composition was heated at 140° C for 30 minutes under vacuum.

One liter of heptane, 0.45 grams of the said activated titanium trichloride component and 1.0 ml of diethyl aluminum monochloride were charged into a stainless steel autoclave of 2 l volume under a nitrogen atmosphere. After evacuating the nitrogen in the autoclave hydrogen was introduced to a partial pressure of 0.5 Kg/cm² and then propylene was introduced to make the total gas phase pressure 2 Kg/cm² gauge. The autoclave was heated up to 70° C. in 5 minutes and the polymerization was continued at 70° C. Propylene was continuously introduced during polymerization to maintain the pressure at 5 Kg/cm² gauge.

The weight of propylene introduced was about 450 grams over a period of 2.24 hours. The unreacted gas was then released, 300 mo of methanol added and the catalysts deactivated by stirring for 30 minutes.

After the autoclave had cooled the contents were removed and washed 3 times at 60° C. with 200 ml of water. The product was filtered and 445 grams of white polypropylene were obtained by drying at 50° C under vacuum.

The polypropylene product had a limiting viscosity of 2.08 dl/g. a bulk density of 0.41 g/ml and the residue from extraction of the polymer by boiling n-heptane was 97.5%. The amorphous polymer obtained by the vaporization of the filtrate weighed 7g.

The polymerization activity of catalyst in this example was 440 g/g hr. and the residual polymer not extracted by boiling n-heptane was 95.5% of the total polymer.

EXAMPLES 2-5

The values of Table 1 were obtained by the process of Example 1 except the wash solvent was changed. Each wash was conducted at the boiling temperature of the respective solvent.

As shown by the Table, the improvement of the invention is effective even if the wash solvent is changed.

After dissolving the active titanium trichloride component of Example 4 in dilute sulfuric acid and extraction by ether, the extract was analyzed by gas chromatography. The analysis, established the amount of diphenyl ether to be too small for detection.

Table 1

| | | Results of Polymerization | | | | | Analysis | |
|---|---|---|---|---|---|---|---|---|
| No. | Wash Solvent | Polymerization time (hour) | Powdery Polypropylene Yield (g) | Amorohous Polypropylene Yield (g) | Residual Polypropylene not extracted by n-Heptane (%) | Polypropylene not extracted by n-Heptane to Total Polymer (%) | Catalytic Activity (g/g.hr) | Limiting Viscosity Number (dl/g) | Bulk Density (g/ml) |
| Example 3 | Benzene | 2.33 | 437 | 9 | 97.5 | 95.5 | 425 | 2.00 | 0.40 |
| Example 3 | Heptane* | 2.40 | 436 | 7 | 97.5 | 95.7 | 410 | 2.11 | 0.41 |
| Example 4 | n-Heptane | 2.17 | 414 | 9 | 97.2 | 95.2 | 433 | 2.03 | 0.40 |
| Example 5 | Monochloro Benzene | 2.53 | 453 | 7 | 97.3 | 95.8 | 405 | 2.18 | 0.39 |

*Technical grade-boiling range of 90–100° C.
Analysis by gas chromatography (weight %): cyclohexane 30.2; methyl cyclohexane 20,6; n-heptane 47.6; toluene 2.1.

The catalytic activity of the catalyst according to the present invention as shown by Examples 1, 2, 3, 4 and 5 is very high.

Comparative Example A (1)

The polymerizations were performed under the same conditions and subsequent treatments as Example 1 except an AA type titanium trichloride, which was the same raw material used in preparing the activated titanium trichloride compound of Example 1, was pulverized for 14 hours and was used without washing as the catalyst component.

After 3.0 hours of polymerization, 292 grams of powdery polypropylene were obtained having a limiting viscosity number of 2.03, residue not extracted by boiling heptane of 96.1% and bulk density of 0.40 g/ml. The amorphous polypropylene weighed 15 grams.

The catalytic activity of this catalyst was only 227 g/g hr and the residual polymer not extracted by boiling n-heptane was 91.4% of the total polymer.

Comparative Example A (2)

Example 1 was repeated except a titanium trichloride composition containing diphenyl ether pulverized under the same conditions as Example 1 was used. The catalyst was not washed as in Example 1.

After 3.0 hours of polymerization, 338 grams of powdery polypropylene and 11 grams of amorphous polypropylene were obtained. The limiting viscosity number of the powdery polypropylene was 2.23 dl/g. The residue not extracted by boiling heptane was 97.1% and the bulk density was 0.42 g/ml. The catalytic activity in this polymerization was 258 g/g hr.

Comparing these results with Example 1, the marked improvement in catalytic activity according to the present invention was very remarkable.

Comparative Examples A (3) and A (4)

The values shown in Table 2 were obtained following the method of Comparative Example A 1 except using a catalyst of AA type titanium trichloride pulverized for 14 hours by the same method as Comparative Example 1 and washed with n-heptane or toluene. The catalytic activity is improved somewhat by washing with n-heptane or toluene. However, in comparison with the values of Examples 1 and 4, it is apparent that the improvement of catalytic activity according to the present invention is quite substantial and stereoregularity was high.

Examples 5, 6, 7, 8 and 9

Propylene was polymerized by the method of Example 1 except the amount of the aluminum chloride-diphenyl ether complex copulverized was varied from that of Example 1. For comparison convenience, the catalytic activity using unwashed activated titanium trichloride are included. The addition of a large amount of aluminum chloride-diphenyl ether complex without washing lowered catalytic activity, while very high catalytic activity resulted when the washed activated component was used.

When the washed activated titanium trichloride was used, the amount of amorphous polymer decreased as the amount of complex was increased. The results of these test are reported in Table 3.

Table 3

| No. | Amount of Aluminum Chloride-Diphenyl Ether Complex (g)* | Polymerization Time (hr) | Powdery Polypropylene Yield (g) | Amorphous Polypropylene Yield (g) | Residual Polypropylene not Extracted by n-Heptane (%) | Residual Polymer not Extracted by n-Heptane to Total Polymer (%) | Catalytic Activity (g/g·hr) | Limiting Viscosity Number (dl/g) | Bulk Specific Gravity (g/ml) | Catalytic Activity using Catalyst without Washing |
|---|---|---|---|---|---|---|---|---|---|---|
| Ex. 6 | 1.14 | 2.33 | 445 | 7 | 97.4 | 95.9 | 431 | 2.21 | 0.40 | 280 |
| Ex. 7 | 4.55 | 2.30 | 450 | 7 | 97.8 | 96.3 | 442 | 2.10 | 0.41 | 248 |
| Ex. 8 | 13.7 | 2.40 | 452 | 6 | 98.3 | 97.0 | 424 | 2.23 | 0.42 | 220 |
| Ex. 9 | 22.8 | 2.55 | 448 | 4 | 98.8 | 97.9 | 390 | 2.03 | 0.42 | 136 |

*Copulverized with 30 g of AA. titanium trichloride

Examples 10 to 36

The preparation of catalysts shown in Table 4 was by the method of Example 1 except other complexes were used instead of the aluminum trichloridediphenyl ether complex. The values reported resulted from following the polymerization procedure of Example 1.

Table 2

| No. | Washing Solvent | Polymerization time (hour) | Powdery Polypropylene Yield (g) | Amorohous Polypropylene Yield (g) | Powdered Polypropylene not extracted by n-Heptane (%) | Residual not extracted by n-Heptane to Total Polymer (%) | Catalytic Activity (g/g.hr) | Limiting Viscosity Number (dl/g) | Bulk Density (g/ml) |
|---|---|---|---|---|---|---|---|---|---|
| Comparison Example A (3) | Toluene | 3.22 | 443 | 14 | 96.8 | 93.8 | 315 | 2.20 | 0.40 |
| Comparison Example A (4) | n-Heptane | 3.42 | 427 | 17 | 96.3 | 92.6 | 290 | 2.03 | 0.41 |

| Example No. | Catalyst Additives Kind Complex of | Use Amount (g) | Wash Solvent | Polymerization Time (hr) | Powdery Poly-Propylene Yield (g) | Amorphous Poly-Propylene Yield (g) | Residual Powdery Poly-Propylene not Extracted by m-Heptane (%) | Residual Polymer not Extracted by n-Heptane to Total Polymer (%) | Catalytic Activity g/g·hr | Limiting Viscosity Number dl/g | Bulk Density g/ml |
|---|---|---|---|---|---|---|---|---|---|---|---|
| 10 | ethyl ether-AlCl₃ | 1.6 | toluene | 2.67 | 465 | 13 | 96.9 | 94.0 | 398 | 2.01 | 0.42 |
| 11 | diethyl ketone-AlCl₃ | 1.65 | heptane | 2.50 | 440 | 28 | 96.2 | 90.4 | 416 | 2.20 | 0.38 |
| 12 | diphenyl ether-AlBr₃ | 2.30 | toluene | 2.35 | 442 | 9 | 97.0 | 95.0 | 426 | 2.18 | 0.40 |
| 13 | di-n-butyl ether-AlCl₃ | 2.38 | toluene | 2.30 | 458 | 12 | 97.3 | 94.8 | 444 | 2.33 | 0.41 |
| 14 | di-iso-propyl ether-AlCl₃ | 1.06 | toluene | 2.35 | 440 | 10 | 96.5 | 94.4 | 425 | 2.08 | 0.43 |
| 15 | dioxane-AlCl₃ | 1.32 | toluene | 2.25 | 439 | 9 | 96.8 | 94.9 | 442 | 2.40 | 0.41 |
| 16 | tetrahydrofuran-AlCl₃ | 2.12 | toluene | 2.30 | 450 | 10 | 97.1 | 95.0 | 444 | 2.11 | 0.42 |

-continued

| | Catalyst Additives | | | | Results of Polymerization | | | | | Analysis | |
|---|---|---|---|---|---|---|---|---|---|---|---|
| Example No. | Kind Complex of | Use Amount (g) | Wash Solvent | Polymerization Time (hr) | Powdery Poly-Propylene Yield (g) | Amorphous Poly-Propylene Yield (g) | Residual Powdery Poly-Propylene not Extracted by m-Heptane (%) | Residual Polymer not Extracted by n-Heptane to Total Polymer (%) | Catalytic Activity g/g · hr | Limiting Viscosity Number dl/g | Bulk Density g/ml |
| 17 | methylisobutyl ketone-AlCl₃ | 1.40 | benzene | 2.23 | 439 | 13 | 96.3 | 93.5 | 450 | 2.15 | 0.38 |
| 18 | diethyleneglycol monoethylether-AlCl₃ | 1.13 | toluene | 2.45 | 440 | 9 | 97.3 | 95.3 | 407 | 2.38 | 0.39 |
| 19 | diphenyl sulfide AlCl₃ | 1.44 | toluene | 2.77 | 453 | 5 | 98.6 | 97.5 | 367 | 2.22 | 0.42 |
| 20 | diphenyl sulfide AlCl₃ | 2.40 | toluene | 2.80 | 458 | 4 | 98.5 | 97.6 | 367 | 2.18 | 0.41 |
| 21 | diphenyl sulfide AlCl₃ | 3.60 | toluene | 2.55 | 443 | 4 | 98.6 | 97.7 | 389 | 2.10 | 0.43 |
| 22 | methylphenyl sulfide AlCl₃ | 1.16 | toluene | 2.70 | 468 | 5 | 98.3 | 97.2 | 389 | 2.21 | 0.40 |
| 23 | methyl phenyl sulfide-AlCl₃ | 1.93 | toluene | 2.75 | 455* | 5 | 98.5 | 97.4 | 372 | 2.08 | 0.41 |
| 24 | methylphenyl sulfide-AlCl₃ | 2.90 | toluene | 2.65 | 445 | 4 | 98.5 | 97.6 | 376 | 2.29 | 0.40 |
| 25 | triphenylphosphine-AlCl₃ | 2.0 | toluene | 2.50 | 450 | 7 | 97.6 | 96.1 | 406 | 2.30 | 0.40 |
| 26 | triphenylphosphite-AlCl₃ | 1.0 | heptane | 2.48 | 456 | 8 | 98.0 | 96.3 | 410 | 2.21 | 0.41 |
| 27 | triphenyl phosphate AlCl₃ | 2.0 | toluene | 2.44 | 451 | 7 | 97.8 | 96.2 | 415 | 2.08 | 0.41 |
| 28 | triphenyl phosphate AlCl₃ | 1.0 | toluene | 2.52 | 446 | 6 | 97.2 | 95.9 | 398 | 2.35 | 0.39 |
| 29 | tritolylphosphate AlCl₃ | 1.0 | toluene | 2.60 | 461 | 8 | 98.0 | 96.3 | 400 | 2.00 | 0.41 |
| 30 | [(CH₃)₂N]₃P=O AlCl₃ | 1.0 | toluene | 2.45 | 439 | 6 | 97.3 | 96.0 | 405 | 2.43 | 0.38 |
| 31 | di(4-methyl)phenyl ether-AlCl₃ | 4.48 | toluene | 2.31 | 438 | 9 | 97.2 | 95.2 | 430 | 2.22 | 0.40 |
| 32 | tetramethylene sulphide-AlCl₃ | 1.0 | toluene | 2.61 | 445 | 5 | 98.2 | 97.1 | 383 | 2.35 | 0.39 |
| 33 | thiophenol-AlCl₃ 1:1 reaction product | 1.2 | toluene | 2.67 | 440 | 5 | 98.4 | 97.3 | 368 | 2.18 | 0.41 |
| 34 | p-methyl thiophenol-AlCl₃ 1:1 reaction product | 1.0 | toluene | 2.67 | 443 | 5 | 98.0 | 96.9 | 372 | 2.32 | 0.40 |
| 35 | phenyl diphenyl-phosphinite/ aluminium chloride | 1.0 | toluene | 2.61 | 448 | 5 | 97.9 | 96.8 | 385 | 2.12 | 0.39 |
| 36 | diphenyl phenyl-phosphonite aluminium chloride | 1.0 | toluene | 2.50 | 453 | 7 | 98.0 | 96.5 | 408 | 2.30 | 0.40 |

*(Mw/Mn) of products polymer was 6.0.

Comparative Example B

The polymerization was performed as in Comparative Example A (1) except that 3.9 weight percent aluminum chloride-methyl phenyl sulfide complex based on the AA type titanium trichloride, was added when the catalyst was charged into the autoclave.

After 3.3 hours of polymerization time, 280 grams of powdery polypropylene were obtained having a limiting viscosity number of 2.53 dl/g, residue not extracted by boiling heptane of 97.6% and bulk density of 0.39 g/ml. Amorphous polypropylene produced weighted 9g.

The catalytic activity was 194 g/g hr. and the residual polymer not extracted by boiling n-heptane based on total polymer was 94.6%.

Comparing these values with the values of Examples 22, 23 and 24, it is obvious that the catalytic activity of this invention is very high and stereoregularity is high.

Following the polymerization of Example B, the inner surface of the autoclave was colored black and ash of the polymer amounted to about 3 times of that of the polymer synthesized according to this invention shown in Example 22. An index of molecular weight distribution (M̄w/M̄n) measured by gel permeation chromatography was 8.3, and it is unusually broad compared with 6.0 of molecular weight distribution of polymer obtained in Example 23.

The M̄w and M̄n utilized herein can be determined by calculation from distribution curves based upon viscosity measurements for the various polymer fractions.

Examples 37–70

Tests were run similar to Example 1 using as additives various organic compounds containing hetero atoms in combination with aluminum halides. The results are shown in Table 5.

Examples 71–87

Tests were run similar to Example 1 except that organic compounds containing hetero atoms alone were used as additives. These additives were copulverized with AA type titanium trichloride and washed with toluene to activate the titanium trichloride component. The results are shown in Table 6.

Examples 88–98

Polymerizations similar to Example 1 were run except using organo-oxygen compounds with organosulfur or organophosphorus and aluminum chloride as additives. The results are shown in Table 7.

Examples 99–105

The polymerizations shown in Table 8 were conducted by method of Example 1 using different additives.

Table 5

| | Catalyst | | | | | Results of Polymerization | | | | | Analysis | |
|---|---|---|---|---|---|---|---|---|---|---|---|---|
| | additive first component | | additive second component | | | | | Residual Powdery Poly-Propylene not Extracted by n-Heptane (%) | Residual Polymer not Extracted by n-Heptane to Total Polymer (%) | | | |
| Ex. No. | Kind | Used Amount (g) | Kind | Used Amount (g) | Wash Solvent | Polymerization Time (hr) | Powdery Poly-Propylene Yield (g) | Amorphous Poly-Propylene Yield (g) | | | Catalytic Activity (g/g.hr) | Limiting Viscosity Number (dl/g) | Bulk Density (g/ml) |
| 37 | diphenyl ether | 3.20 | AlCl₃ | 1.61 | toluene | 2.28 | 445 | 8 | 97.2 | 95.5 | 440 | 2.28 | 0.41 |
| 38 | diphenyl ether | 1.60 | AlBr₃ | 1.60 | toluene | 2.25 | 435 | 7 | 97.0 | 95.4 | 436 | 2.11 | 0.41 |
| 39 | diphenyl ether | 1.34 | AlI₃ | 1.84 | toluene | 2.35 | 450 | 6 | 97.1 | 95.8 | 431 | 2.25 | 0.39 |
| 40 | diethyl ketone | 0.65 | AlCl₃ | 1.41 | toluene | 2.45 | 460 | 20 | 96.4 | 92.4 | 435 | 2.21 | 0.38 |
| 41 | diphenyl ketone | 1.09 | AlCl₃ | 1.41 | toluene | 2.30 | 435 | 10 | 96.6 | 94.4 | 430 | 2.30 | 0.38 |
| 42 | acetyl acetone | 1.10 | AlCl₃ | 1.01 | toluene | 2.50 | 440 | 8 | 97.0 | 95.3 | 398 | 2.22 | 0.41 |
| 43 | methyl acetate | 0.33 | AlCl₃ | 1.01 | toluene | 2.50 | 450 | 9 | 97.0 | 95.1 | 408 | 2.09 | 0.40 |
| 44 | diethyl sulfide | 0.40 | AlCl₃ | 0.59 | toluene | 2.80 | 455 | 6 | 98.2 | 96.9 | 366 | 2.33 | 0.41 |
| 45 | diphenyl sulfide | 0.83 | AlCl₃ | 0.59 | toluene | 2.60 | 448 | 4 | 98.5 | 97.6 | 386 | 2.30 | 0.43 |
| 46 | ditolyl sulfide | 0.56 | AlCl₃ | 0.35 | toluene | 2.60 | 438 | 3 | 98.2 | 97.5 | 377 | 2.03 | 0.39 |
| 47 | methylphenyl sulfide | 0.56 | AlCl₃ | 0.60 | toluene | 2.55 | 450 | 4 | 98.3 | 97.4 | 396 | 2.41 | 0.42 |
| 48 | ethylphenyl sulfide | 0.62 | AlCl₃ | 0.60 | toluene | 2.60 | 453 | 4 | 98.5 | 97.6 | 390 | 2.10 | 0.41 |
| 49 | triphenyl phosphine | 1.0 | AlCl₃ | 0.56 | toluene | 2.55 | 463 | 7 | 97.8 | 96.3 | 410 | 2.23 | 0.42 |
| 50 | dimethyl-phosphinous bromide | 0.7 | AlBr₃ | 1.33 | toluene | 2.57 | 453 | 7 | 98.0 | 96.5 | 398 | 2.18 | 0.39 |
| 51 | methyl-phosphinous dichloride | 0.4 | AlI₃ | 1.39 | toluene | 2.60 | 461 | 6 | 97.4 | 96.1 | 399 | 2.22 | 0.40 |
| 52 | ethyldiphenyl phosphinite | 0.6 | AlCl₃ | 0.35 | toluene | 2.65 | 440 | 6 | 97.9 | 96.5 | 374 | 2.40 | 0.40 |
| 53 | diphenylmethyl phosphonite | 0.6 | AlCl₃ | 0.32 | toluene | 2.55 | 430 | 7 | 97.8 | 96.2 | 380 | 2.30 | 0.39 |
| 54 | triphenyl phosphite | 0.6 | AlCl₃ | 0.26 | toluene | 2.50 | 453 | 6 | 98.0 | 96.6 | 408 | 2.15 | 0.40 |
| 55 | diphenyl-chloro phosphite | 0.4 | AlBr₃ | 0.42 | toluene | 2.50 | 433 | 7 | 97.8 | 96.2 | 390 | 2.08 | 0.42 |
| 56 | phenyldichloro phosphite | 0.3 | AlI₃ | 0.63 | toluene | 2.70 | 470 | 9 | 98.0 | 96.1 | 394 | 2.30 | 0.42 |
| 57 | trisdiethyl amino-phosphine | 0.4 | AlCl₃ | 0.33 | toluene | 2.60 | 435 | 7 | 97.9 | 96.3 | 377 | 2.21 | 0.40 |
| 58 | triphenyl phosphate | 1.0 | AlCl₃ | 0.41 | toluene | 2.43 | 445 | 8 | 98.4 | 96.6 | 415 | 2.23 | 0.41 |
| 59 | tri(p-tolyl) phosphate | 1.0 | AlCl₃ | 0.36 | toluene | 2.50 | 453 | 7 | 98.5 | 96.5 | 410 | 2.38 | 0.39 |
| 60 | diphenyl-phosphoro chloridate | 0.4 | AlCl₃ | 0.20 | toluene | 2.60 | 465 | 8 | 97.8 | 96.1 | 403 | 2.35 | 0.41 |
| 61 | phenyldi-chloro phosphate | 0.4 | AlCl₃ | 0.25 | toluene | 2.60 | 445 | 8 | 97.9 | 96.1 | 389 | 2.10 | 0.41 |
| 62 | triphenyl phosphine oxide | 0.4 | AlCl₃ | 0.19 | toluene | 2.44 | 445 | 6 | 97.5 | 96.2 | 410 | 2.28 | 0.41 |
| 63 | triphenyl phosphine sulphide | 0.4 | AlCl₃ | 0.18 | toluene | 2.67 | 456 | 4 | 98.1 | 97.2 | 376 | 2.31 | 0.43 |
| 64 | di(2-chloro-phenyl)ether | 1.43 | AlCl₃ | 1.01 | toluene | 2.40 | 450 | 9 | 97.2 | 95.3 | 425 | 2.30 | 0.42 |
| 65 | ethylene glycol diphenyl-ether | 0.96 | AlCl₃ | 0.50 | toluene | 2.47 | 438 | 7 | 97.0 | 95.4 | 400 | 2.22 | 0.40 |
| 66 | methyl benzoate | 0.61 | AlCl₃ | 1.01 | toluene | 2.40 | 443 | 9 | 97.8 | 95.8 | 418 | 2.18 | 0.42 |
| 67 | tetra-methylene | 0.40 | AlCl₃ | 0.60 | toluene | 2.64 | 453 | 5 | 98.2 | 97.1 | 385 | 2.31 | 0.42 |

Table 5-continued

| | Catalyst | | | | | | Results of Polymerization | | | | | |
|---|---|---|---|---|---|---|---|---|---|---|---|---|
| | additive first component | | additive second component | | | | | | Residual Powdery Poly-Propylene not Extracted by n-Heptane (%) | Residual Polymer not Extracted by n-Heptane to Total Polymer (%) | Analysis | |
| Ex. No. | Kind | Used Amount (g) | Kind | Used Amount (g) | Wash Solvent | Polymerization Time (hr) | Powdery Poly-Propylene Yield (g) | Amorphous Poly-Propylene Yield (g) | | | Catalytic Activity (g/g·hr) | Limiting Viscosity Number (dl/g) | Bulk Density (g/ml) |
| 68 | sulphide benzenethiol | 0.49 | AlCl₃ | 0.60 | toluene | 2.62 | 455 | 5 | 98.3 | 97.2 | 390 | 2.22 | 0.39 |
| 69 | p-toluene thiol | 0.56 | AlCl₃ | 0.60 | toluene | 2.56 | 447 | 4 | 98.1 | 97.2 | 391 | 2.20 | 0.43 |
| 70 | triphenyl phosphine sulphide | 0.40 | AlCl₃ | 0.38 | toluene | 2.58 | 440 | 4 | 98.0 | 97.0 | 383 | 2.33 | 0.39 |

Table 6

| | Catalyst additive | | | | | Results of Polymerization | | | | | |
|---|---|---|---|---|---|---|---|---|---|---|---|
| Ex. No. | Kind | Used Amount (g) | Wash Solvent | Polymerization Time (hr) | Powdery Poly-Propylene Yield (%) | Amorphous Poly-Propylene Yield (%) | Residual Powdery Poly Propylene not Extracted by n-Heptane (%) | Polymer not Extracted by n-Heptane to Total Polymer (%) | Catalytic Activity (g/g·hr) | Limiting Viscosity Number (dl/g) | Bulk Density (g/ml) |
| 71 | diphenyl ether | 1.75 | toluene | 2.67 | 445 | 7 | 97.0 | 95.4 | 375 | 2.32 | 0.42 |
| 72 | diethyl ether | 0.44 | toluene | 2.75 | 451 | 8 | 97.2 | 95.5 | 370 | 2.12 | 0.42 |
| 73 | diethyl ketone | 0.39 | toluene | 2.87 | 460 | 15 | 98.8 | 93.7 | 368 | 2.05 | 0.39 |
| 74 | diphenyl sulfide | 0.83 | toluene | 2.87 | 440 | 5 | 98.1 | 96.9 | 345 | 2.23 | 0.41 |
| 75 | methylphenyl sulfide | 0.56 | toluene | 2.93 | 448 | 4 | 97.8 | 96.9 | 343 | 2.11 | 0.40 |
| 76 | diallyl sulfide | 0.43 | toluene | 2.90 | 450 | 6 | 98.0 | 96.7 | 350 | 2.27 | 0.42 |
| 77 | p-phenyl benzenethiol | 0.49 | toluene | 3.0 | 453 | 5 | 98.1 | 97.0 | 340 | 2.30 | 0.40 |
| 78 | dipropyl sulfide | 0.50 | toluene | 3.08 | 455 | 6 | 97.8 | 96.5 | 333 | 2.09 | 0.42 |
| 79 | triphenyl phosphite | 0.5 | toluene | 2.87 | 451 | 6 | 97.6 | 96.3 | 357 | 2.18 | 0.39 |
| 80 | tri p-tolyl phosphite | 0.5 | toluene | 2.87 | 463 | 7 | 98.1 | 96.6 | 365 | 2.37 | 0.39 |
| 81 | triphenyl phosphate | 0.7 | toluene | 2.86 | 457 | 7 | 97.9 | 96.4 | 360 | 2.19 | 0.43 |
| 82 | di(2-chlorophenyl) ether | 1.08 | toluene | 2.63 | 455 | 7 | 97.2 | 95.7 | 390 | 2.20 | 0.39 |
| 83 | diphenyl ketone | 0.82 | toluene | 2.54 | 438 | 13 | 97.2 | 94.4 | 395 | 2.18 | 0.39 |
| 84 | methyl benzoate | 0.61 | toluene | 2.62 | 443 | 9 | 97.5 | 95.6 | 383 | 2.35 | 0.40 |
| 85 | p-chlorobenzenethiol | 0.52 | toluene | 2.77 | 441 | 5 | 98.2 | 97.1 | 358 | 2.27 | 0.40 |
| 86 | tri-n-butyl phosphine | 0.51 | toluene | 2.67 | 444 | 7 | 97.5 | 96.0 | 375 | 2.66 | 0.39 |
| 87 | triphenyl phosphine | 0.55 | toluene | 2.60 | 439 | 6 | 97.5 | 96.2 | 380 | 2.57 | 0.43 |

Table 7

| | Catalyst | | | | | | | |
|---|---|---|---|---|---|---|---|---|
| | additive first component | | additive second component | | additive third component | | | Polymerization Time (hr) |
| Example No. | Kind | Used Amount (g) | Kind | Used Amount (g) | Kind | Used Amount (g) | Wash Solvent | |
| 88 | diphenyl ether | 1.8 | methylphenyl sulfide | 0.56 | AlCl₃ | 2.0 | toluene | 2.40 |
| 89 | diphenyl ether | 1.3 | methylphenyl sulfide | 0.93 | AlCl₃ | 2.0 | toluene | 2.52 |
| 90 | diphenyl ether | 1.8 | diphenyl sulfide | 0.84 | AlCl₃ | 2.0 | toluene | 2.38 |
| 91 | diphenyl ether | 1.8 | benzenethiol | 0.50 | AlCl₃ | 2.0 | toluene | 2.47 |
| 92 | diphenyl ether | 2 | tri(n-butyl) phosphate | 0.5 | AlCl₃ | 1.8 | toluene | 2.44 |
| 93 | diphenyl ether | 2 | triphenyl phosphate | 1.0 | AlCl₃ | 2.0 | toluene | 2.38 |
| 94 | di(methylphenyl) ether | 1.78 | methylphenyl sulfide | 0.56 | AlCl₃ | 1.81 | toluene | 2.36 |
| 95 | diphenyl ketone | 1.09 | triphenyl phosphite | 0.83 | AlCl₃ | 1.41 | toluene | 2.35 |
| 96 | diphenyl ether | 1.80 | tetramethylene sulphide | 0.54 | AlCl₃ | 2.01 | toluene | 2.35 |
| 97 | diphenyl ether | 2.04 | triethyl phosphine | 0.35 | AlCl₃ | 1.61 | toluene | 2.32 |
| 98 | diphenyl ether | 2.04 | triphenyl phosphine sulphide | 0.58 | AlCl₃ | 2.01 | toluene | 2.32 |

Results of Polymerization
Residual Powdered   Residual Polymer

Table 7-continued

| Example No. | Powdery Polypropylene Yield (g) | Amorphous Polypropylene Yield (g) | Polypropylene Extracted by n-Heptane (%) | Extracted by n-Heptane for Total Polymer (%) | Catalytic Activity (g/g.hr) | Analysis Limiting Viscosity Number (dl/g) | Bulk Density (g/ml) |
|---|---|---|---|---|---|---|---|
| 88 | 453 | 6 | 98.2 | 96.9 | 425 | 2.17 | 0.41 |
| 89 | 461 | 4 | 98.1 | 97.2 | 410 | 2.30 | 0.43 |
| 90 | 455 | 5 | 98.3 | 97.2 | 430 | 2.18 | 0.42 |
| 91 | 453 | 6 | 98.0 | 96.7 | 413 | 2.09 | 0.40 |
| 92 | 458 | 6 | 97.8 | 96.5 | 423 | 2.32 | 0.41 |
| 93 | 441 | 5 | 97.2 | 96.3 | 416 | 2.05 | 0.39 |
| 94 | 443 | 4 | 98.1 | 97.2 | 420 | 2.30 | 0.38 |
| 95 | 455 | 5 | 97.8 | 96.7 | 435 | 2.32 | 0.39 |
| 96 | 458 | 6 | 98.0 | 96.7 | 420 | 2.35 | 0.40 |
| 97 | 444 | 5 | 98.2 | 97.1 | 430 | 2.27 | 0.39 |
| 98 | 441 | 6 | 97.9 | 96.7 | 428 | 2.18 | 0.40 |

Table 8

| Example No. | Catalyst additive first component Kind (Complex of) | Amount (g) | Catalyst additive second component Kind (Complex of) | Used Amount (g) | Wash Solvent | Polymerization Time (hr) |
|---|---|---|---|---|---|---|
| 99 | diphenyl ether-AlCl$_3$ | 2.3 | methyl phenyl sulfide-AlCl$_3$ | 1.9 | toluene | 2.33 |
| 100 | diphenyl ether-AlCl$_3$ | 3.2 | methyl phenyl sulfide-AlCl$_3$ | 1.1 | toluene | 2.32 |
| 101 | diphenyl ether-AlCl$_3$ | 2.3 | diphenyl sulfide-AlCl$_3$ | 2.4 | toluene | 2.35 |
| 102 | diphenyl ether-AlCl$_3$ | 3.5 | triphenyl phosphate-AlCl$_3$ | 2.5 | toluene | 2.35 |
| 103 | diphenyl ether-AlCl$_3$ | 3.5 | triphenyl phosphine-AlCl$_3$ | 2.0 | toluene | 2.41 |
| 104 | diphenyl ether-AlCl$_3$ | 3.19 | tris(NN-dimethyl amino) phosphine oxide-AlCl$_3$ | 2.1 | toluene | 2.4 |
| 105 | diphenyl ether-AlCl$_3$ | 3.19 | lauryl thioalcohol | 0.9 | toluene | 2.35 |

Results of Polymerization

| Example No. | Powdery Polypropylene Yield (g) | Amorphous Polypropylene Yield (g) | Residual Powdered Polypropylene Extracted by n-Heptane (%) | Residual Polymer Extracted by n-Heptane for Total Polymer (%) | Catalytic Activity (g/g.hr) | Analysis Limiting Viscosity Number (dl/g) | Bulk Density (g/ml) |
|---|---|---|---|---|---|---|---|
| 99 | 458 | 4 | 98.1 | 97.2 | 440 | 2.30 | 0.43 |
| 100 | 437 | 4 | 98.0 | 97.0 | 428 | 2.30 | 0.39 |
| 101 | 455 | 5 | 98.5 | 97.4 | 435 | 2.21 | 0.43 |
| 102 | 457 | 6 | 97.7 | 96.4 | 438 | 2.15 | 0.41 |
| 103 | 459 | 6 | 97.4 | 96.1 | 429 | 2.08 | 0.41 |
| 104 | 458 | 6 | 97.8 | 96.5 | 430 | 2.21 | 0.40 |
| 105 | 448 | 5 | 98.2 | 97.1 | 428 | 2.09 | 0.40 |

Example 106

Ethylene was polymerized using the activated titanium trichloride component obtained of Example 1.

One liter of n-heptane, 0.153 grams of the activated titanium trichloride and 1.2 ml of diethylaluminum monochloride were charged into the autoclave of 2 l volume under nitrogen atmosphere. After exhausting nitrogen in the autoclave by vacuum pump, partial pressure of 2.0 kg/cm$^2$ gauge of hydrogen was charged and then ethylene was charged to obtain a gas phase pressure of 4 kg/cm$^2$ gauge.

The contents of the autoclave were heated to 90° C over a period of 20 minutes and the polymerization was allowed to continue. Ethylene was introduced continuously during polymerization to maintain the pressure at 9.5 kg/cm$^2$ gauge.

The polymerized weight of ethylene became about 500 grams after 2.58 hours. The supply of ethylene was stopped, the unreacted gas exhausted, 300 ml of methanol added and the catalysts deactivated by stirring for 30 minutes.

After the autoclave cooled, the cotents was removed, washed with 200 ml of water and filtered. White powdery polyethylene weighting 514 g was obtained by drying at 60° C, under vacuum.

The limiting viscosity number of the polyethylene was 2.65 dl/g and the bulk density was 0.40 g/ml. The catalytic activity in this polymerization was 1302 g/g hr.

Comparison Example C

The polymerization of ethylene was conducted under conditions of Example 106 except a titanium component of AA type titanium trichloride pulverized for 14 hours without addition of the complex of aluminum chloride-diphenyl ether.

After 4.4 hours of polymerization time, 508 grams of polyethylene was obtained having limiting viscosity number of 2.85 dl/g, a bulk density of 0.37 g/ml. The catalytic activity in this polymerization reaction was 754 g/g hr.

Comparing this example with Example 106, the activation of this invention is demostrated to be effective for the polymerization of ethylene.

Example 107

Titanium tetrachloride was reduced by ethylaluminum sesquichloride as follows:

Titanium tetrachloride (0.2 mol) and 100 ml of n-heptane were added to a four necked flask under nitrogen atmosphere and 0.21 mol of aluminum sesquichloride and 100 ml of n-heptane were added dropwise by a dropping funnel over a 30 minute period. The temperature was set at about 5° and after reaction at a temperature range from 0° C to 5° C for 2 hours, the mixture was placed in an autoclave and was heated to 120° C. After being at this temperature for 2 hours the reaction product was washed 5 times with 200 ml of n-heptane.

The washed reaction product was placed in a flask under a nitrogen atmosphere and the heptane was removed by heating at 140° C for 20 minutes under vacuum to obtain a dry titanium trichloride composition.

After adding 1.3 grams of the reaction product of 1 mol of aluminum chloride and 1 mol of ethyl acetate to 30 grams of the dried titanium trichloride composition, the mass was pulverized and washed with toluene as in Example 1.

The polymerization reaction was conducted as in Example 1 using the activated titanium trichloride component described above.

After 1.94 hours of polymerization time, we obtained 447 grams of powdery polypropylene and 17 grams of amorphous polypropylene.

The limiting viscosity number of the polypropylene was 2.64 dl/g, the residual polymer not extracted by boiling n-heptane was 96.8% and the catalytic activity was 398 g/g hr.

Comparative Example D

The polymerization of propylene was conducted as in Example 1 using a titanium trichloride catalyst component which was synthesized as in Example 107 except it was pulverized without additives for 14 hours. After 3.23 hours of polymerization time, 413 grams of powdery polypropylene were obtained and 25 grams of amorphous polypropylene. The catalytic activity in this polymerization was 225 g/g hr. which is substantially inferior to the 398 g/g hr. demonstrated in Example 1-7.

EXAMPLE 108

Polymerization was conducted using the same catalyst as Example 1 by in method of Example 1 except using a gas mixture of propylene-ethylene containing 1.5 mol % of ethylene instead of propylene as the monomer. The catalytic activity in this polymerization reaction was 482 g/g hr.

EXAMPLE 109

Aluminum chloride-diphenyl ether complex was added into AA type activated titanium trichloride and was copulverized in Example 1. After washing 4 times, with toluene, toluene was added to make-up a slurry with a concentration of 4.5 g activated titanium trichloride 100 ml.

The polymerization of propylene was conducted as in Example 1 using as the catalyst, 10 ml of the said slurry and 1.0 ml of diethyl aluminum monochloride.

After 2.2 hours of polymerization, 7 grams of amorphous polypropylene and 443 grams of powdery polypropylene were obtained having a limiting viscosity number of 276 dl/g and a residue not extracted by n-heptane of 97.7%.

The catalytic activity in this polymerization reaction was 458 g/g hr.

EXAMPLE 110

The polymerization was effected in the similar condition and treatment as in Example 1 using 1.8 ml of diisobutylaluminum monochloride as an organoaluminum compound and using the activated titanium trichloride component of Example 1 as the activated titanium trichloride component.

The catalytic activity in this polymerization reaction was 219 g/g hr and the residual polymer not extracted by boiling n-heptane based on total polymer product was 95.3%.

The polymerization was conducted using unactivated AA type titanium trichloride for comparison. The catalytic activity in the comparison polymerization was 141 g/g hr. and the residual polymer not extracted by n-heptane was 90.2% based on the total polymer product.

EXAMPLE 111

At a polymerization temperature of 50° C following the method of Example 1 using 0.75 ml of triethyl aluminum as the organoaluminum compound and using the activated titanium trichloride of Example 1 have a catalytic activity of 468 g/g hr. and using unactivated AA type titanium trichloride for comparison, the catalytic activity was only 308 g/g hr.

EXAMPLE 112

Propylene was polymerized by method of Example 1 except using unpulverized titanium trichloride reduced from titanium tetrachloride by aluminum instead of the AA type, which was the raw material used in preparation of the catalyst of Example 1.

After 2.38 hr of polymerization, 453 grams of powdery polypropylene and 7 grams of amorphous polypropylene were obtained.

The residual polymer not extracted by boiling n-heptane from the powdery polypropylene, was 97.2% and the limiting viscosity number of it was 2.32 dl/g. The bulk density of it was 0.40 g/ml.

The catalytic activity was 428 g/g hr and the residual polymer extracted by n-heptane based on the total polymer was 97.7%.

EXAMPLE 113

A mass polymerization was conducted using an activated titanium trichloride component as synthesized in Example 1.

The activated titanium trichloride component was 0.2 grams suspended in 30 ml of heptane and 0.8 ml of diethylaluminum monochloride was charged into an autoclave SUS-27 of 6 l under nitrogen atmosphere.

After evacuation of the nitrogen 2 l of hydrogen (at standard conditions) and 2.5 kilograms of propylene were added thereto. The autoclave was heated to a temperature of 60° over 15 minutes. The polymerization was conducted at 60° C and after 5 hours, 20 ml of methanol was added and stirred for 10 minutes to deactivate the catalyst. After cooling, the contents were removed and 1,065 grams of polypropylene was obtained by drying under vacuum at 60° C.

The limiting viscosity of the polypropylene was 2.21, the bulk density was 0.43 g/ml and the residue not extracted by boiling n-heptane was 92.3%. The catalytic activity in this polymerization was 1,065 g/g hr.

EXAMPLE 114–123

The values obtained by mass polymerization of propylene shown in Table 9 resulted from the method of Example 112 except the additives were varied.

Table 9

| Example No. | Catalyst additive first component Kind | Used Amount (g) | additive second component Kind | Used Amount (g) | Wash Solvent | Polymerization Time (hr) | Results of Polymerization Powdery Polypropylene Yield (g) | Catalytic Activity (g/g.hr) | Analysis Residual Polymer Extracted by n-Heptane (%) | Limiting Viscosity Number (dl/g) | Bulk Density (g/ml) |
|---|---|---|---|---|---|---|---|---|---|---|---|
| 114 | methylphenyl sulfide-AlCl$_3$ | 1.9 | — | — | toluene | 5.0 | 853 | 853 | 95.0 | 2.33 | 0.38 |
| 115 | n-butyl phosphine-AlCl$_3$ | 1.5 | — | — | toluene | 5.0 | 955 | 955 | 93.3 | 2.25 | 0.40 |
| 116 | diphenyl thioether-AlCl$_3$ | 2.4 | — | — | toluene | 5.0 | 815 | 815 | 95.3 | 2.57 | 0.41 |
| 117 | diphenyl ether-AlCl$_3$ | 3.2 | diphenyl sulfide-AlCl$_3$ | 1.2 | heptane | 5.0 | 935 | 935 | 95.8 | 2.40 | 0.39 |
| 118 | diphenyl ether-AlCl$_3$ | 2.3 | diphenyl sulfide-AlCl$_3$ | 2.4 | toluene | 5.0 | 1065 | 1065 | 94.2 | 2.31 | 0.40 |
| 119 | diphenyl ether-AlCl$_3$ | 2.3 | methylphenyl-sulfide-AlCl$_3$ | 1.9 | toluene | 5.0 | 983 | 983 | 95.0 | 2.18 | 0.41 |
| 120 | diphenyl ether-AlCl$_3$ | 2.3 | methyl phenyl sulfide-AlCl$_3$ | 2.4 | heptane | 5.0 | 1008 | 1008 | 94.0 | 2.21 | 0.42 |
| 121 | diphenyl ether-AlCl$_3$ | 3.5 | triphenyl phosphate-AlCl$_3$ | 2.0 | toluene | 5.0 | 1060 | 1060 | 93.8 | 2.11 | 0.39 |
| 122 | diphenyl ether-AlCl$_3$ | 3.5 | triphenyl phosphin AlCl$_3$ | 2.0 | toluene | 5.0 | 1050 | 1050 | 93.7 | 2.35 | 0.41 |
| 123 | diphenyl ether-AlCl$_3$ | 2.3 | methyl phenyl sulfide | 0.9 | heptane | 5.0 | 820 | 820 | 94.8 | 2.20 | 0.41 |

EXAMPLE 124

The gas phase polymerization of propylene was executed using a catalyst synthesized as in Example 1.

Propylene powder, 150 grams, 0.15 of the activated titanium trichloide component as synthesized in Example 1 and 0.6 ml of diethylaluminum monochloride were charged into 2 l autoclave under a nitrogen atmosphere. After adding 300 ml of hydrogen at standard conditions, the inner temperature was risen to 80° C and the polymerization was conducted at a pressure of 30 kg/cm² gauge for 2 hours.

The polymerization was stopped by addition of 30 ml of methanol and 608 grams of powdery polypropylene were obtained. After substracting 150 grams of polypropylene used as the carrier, the polyprpylene produced in this polymerization reaction as 458 grams.

The limiting viscosity number of the polypropylene was 2.38 dl/g, the residue not extracted by n-heptane was 93.8% and the bulk density was 0.40 g/ml.

The catalytic activity in this polymerization reaction was 1,520 g/g hr.

What is claimed is:

1. A catalyst composition useful for polymerizing α-olefins comprising:
   A. An activated titanium trichloride component obtained by copulverizing a titanium trichloride composition with a complex or reaction product of an aluminum halide and at least one organic oxygen-containing compound selected from the group consisting of oxyethers, carboxylic esters and oxyketones and washing the product of copulverization with a solvent selected from the group consisting of aliphatic, cycloaliphatic and aromatic hydrocarbons, their halogen derivatives and mixtures thereof; and
   B. an organoaluminum compound.

2. The catalyst composition according to claim 1 wherein the titanium trichloride composition is prepared by reduction of titanium tetrachloride with metallic aluminum or an organoaluminum compound.

3. The catalyst composition according to claim 1 wherein at least 30 weight percent of said complex or reaction product is removed by washing one part by weight of said product of copulverization with from 1 to 500 parts by weight of said solvent.

4. The catalyst composition according to claim 1 wherein the organoaluminum compound has the formula Al(R$^5$)$_2$X wherein R$^5$ is alkyl or aryl having up to 20 carbon atoms and X is R$^5$, halogen or alkoxy.

5. The catalyst composition according to claim 1 wherein said complex or reaction product is present in an amount of a about 1 to 30 weight percent of said titanium trichloride composition and the molar ratio of said aluminum halide to said organic oxygen-containing compound is between about 2:1 and 1:2.

6. The catalyst composition according to claim 1 wherein said organic oxygen-containing compound is an oxyether.

7. The catalyst composition according to claim 1 wherein said organic oxygen-containing compound is a carboxylic ester.

8. The catalyst composition according to claim 1 wherein said organic oxygen-containing compound is an oxyketone.

9. A process for polymerizing an α-olefin which comprises polymerizing or copolymerizing said α-olefin in the presence of the catalyst of claim 1.

10. The process according to claim 9 wherein the titanium trichloride composition is prepared by reduction of titanium tetrachloride with metallic aluminum or an organoaluminum compound.

11. The process according to claim 9 wherein at least 30 weight percent of said complex or reaction product is removed by washing one part by weight of said product of copulverization with from 1 to 500 parts by weight of said solvent.

12. The process according to claim 9 wherein the organo-aluminum compound has the formula Al(R$^5$)$_2$X wherein R$^5$ is alkyl or aryl having up to 2 carbon atoms and X is R$^5$, halogen or alkoxy.

13. The process according to claim 9 wherein said α-olefin is selected from the group consisting of ethylene, propylene, butene-1, pentene-1, hexene-1 and 4-methyl-pentene-1.

14. The process according to claim 9 wherein said oxygen-containing compound is an oxyether.

15. The process according to claim 9 wherein said oxygen-containing compound is a carboxylic ester.

16. The process according to claim 9 wherein said oxygen-containing compound is an oxyketone.

17. A process for polymerizing an alpha-olefin comprising polymerizing said alpha-olefin with a catalyst comprising: (A) a titanium trichloride component obtained by copulverizing a titanium trichloride composition with a complex or reaction product of an aluminum trihalide and at least one organic oxygen-containing compound selected from the groups consisting of oxyethers, carboxylic esters and oxyketones, washing the product of copulverization with a solvent selected from the group consisting of aliphatic and aromatic hydrocarbons, their halogen derivatives and mixtures thereof; and (B) an organoaluminum compound.

* * * * *